March 8, 1927. 1,620,572
M. ROSENBLUM
THREAD AND CORD CUTTER
Filed March 9, 1926
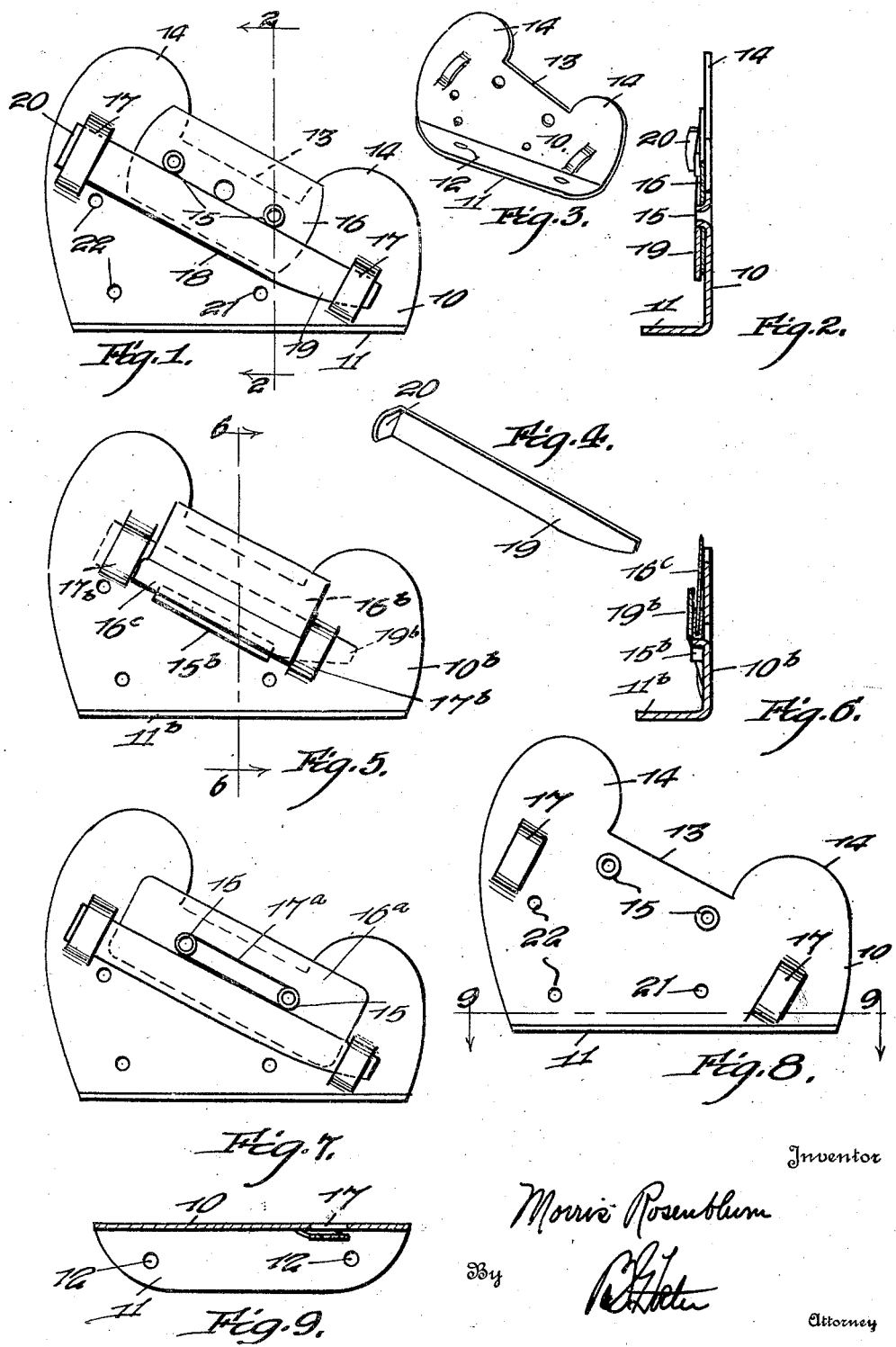
Inventor
Morris Rosenblum
By
Attorney Patented Mar. 8, 1927.

1,620,572

UNITED STATES PATENT OFFICE.

MORRIS ROSENBLUM, OF PITTSFIELD, MASSACHUSETTS.

THREAD AND CORD CUTTER.

Application filed March 9, 1926. Serial No. 93,383.

The present invention relates to thread and twine cutters, the object being to provide a simple article of manufacture of a novel character, and one that can be used in a variety of ways, and in various locations.

In the accompanying drawings:

Figure 1 is a side elevation of one embodiment of the invention,

Figure 2 is a sectional view on the line 2—2 of Figure 1,

Figure 3 is a perspective view of the body of the device,

Figure 4 is a perspective view of the holding bar,

Figure 5 is a side elevation of a slightly different form of construction,

Figure 6 is a sectional view on the line 6—6 of Figure 5,

Figure 7 is a side elevation of the form shown in Figure 1, with a different type of cutter blade in place thereon, Figure 8 is a side elevation of the body of the structure shown in Figures 1 and 7, Figure 9 is a horizontal sectional view on the line 9—9 of Figure 8.

In the embodiment disclosed in Figures 1, 2, 3, 7, 8 and 9, a body is employed, designated 10, which is preferably of sheet metal, and has one margin bent at right angles, as illustrated at 11, forming a base flange, said flange being provided with openings 12 for the reception of fastening devices. The opposite margin is cut-away to provide a recess 13, the portions at the ends of said recess upstanding, and preferably being rounded, as illustrated at 14, forming both guides and guards.

At the base of the recess 13, projections 15 are punched from the material of the body, and are spaced apart a distance equal to the distance between the usual holes of a well-known type of razor blade. Such a blade is shown at 16, and the arrangement is such that when it is placed on the projections 15, one cutting edge will extend across the recess 13 between the guides and guards 14. Retaining straps 17 are punched from the body of the material at different heights, the bottom edge of the recess 13 being inclined, as shown, and through these straps is detachably passed a holding bar 18, one end of which is preferably tapered, as shown at 19, so that it may be readily introduced behind the straps, the other end being offset to form a finger piece 20. The body 10 is also preferably provided with an opening 21, contiguous to the flange 11, and near its opposite end has a plurality of openings 22.

In using the device, the body 10 may be mounted in a variety of positions. For example, the flange 11 may be placed on a table or counter, and fastened by devices passed through the holes 12, or it may be mounted on the edge of a counter or table, the fasteners being passed through the opening 21 and one of the openings 22, accordingly as to whether the device is to be placed at an inclination or horizontal. It obviously may be otherwise located. A razor blade, as 16, is placed upon the projections 15, and the holding bar is then passed through the straps 17, the finger piece 20 constituting means for readily operating the bar, and acting as a stop to prevent its passage entirely through the upper strap 17. This bar, passing behind the lower portion of the blade, secures it in place and covers the lower edge. The upper edge, extending above the bottom of the recess 13, is in the position to have a cord or thread drawn across it, so as to sever the same, the ends 14 forming a mouth or guide to the cutting edge, and also projecting above the edge, thereby constituting guards.

Different types of blades may be mounted on the device above described. Thus, in Figure 7, a different type of blade $16^a$ is shown, which blade has a slot $17^a$. The projections 15 are such that they will engage in the ends of the slot. The other parts being the same, the blade is held in the manner already described.

A slightly modified form of construction is shown in Figures 5 and 6. In this structure, the body is designated $10^b$ and the bottom flange is designated $11^b$. The formation of the body is the same as that first described, with the exception that instead of projections 15, a flange $15^b$ is cut from the body and offset to constitute a rest or bearing for the rear side of the blade. The blade used with this form of construction is designated $16^b$, and has a stiffening back element $16^c$, which rests upon the flange $15^b$. The blade, having no openings, is placed upon the supporting flange $15^b$, and a holding bar $19^b$ is passed through straps $17^b$, formed from the body. In this particular instance the said straps are preferably placed at the ends of the blade $16^b$, in order that said blade is held against longitudinal sliding upon the flange 15ᵇ.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim, is:

1. A device of the character set forth, comprising a body having means whereby it may be mounted on a support, said body having a cutter blade supporting means, spaced offset straps at the ends of the blade supported by said means, and a holding bar that extends the length of the space between the straps and passes through the straps behind the blade throughout its length.

2. A device of the character set forth, comprising a body sheet having a recess in one edge and outstanding guards at the ends of the recess, said body having means whereby it may be mounted on a support, said body having a cutter blade supporting means behind the recess, spaced offset straps at the opposite ends of the recess and at the ends of the blade supported by said means, and a holding bar that extends the length of the recess and passes through the straps behind the blade.

3. A device of the character set forth, comprising a body sheet having a recess in one edge and outstanding outwardly curved guards at the ends of the recess, said body having a supporting flange along its opposite edge, cutter blade supporting means struck from the body between the recess and the flange for supporting a blade with its cutting edge across the recess between the guards, offset straps struck from the body at the ends of the recess, and a holding bar that is slidable in the straps and extends the length of the recess to hold a blade in the mounting means.

In testimony whereof, I affix my signature.

MORRIS ROSENBLUM.